(12) United States Patent
Nall

(10) Patent No.: US 11,390,456 B2
(45) Date of Patent: Jul. 19, 2022

(54) ASSEMBLIES, SYSTEMS AND METHODS FOR MATURATION OF DISTILLED SPIRITS

(71) Applicant: Patrick Daniel Nall, Louisville, KY (US)

(72) Inventor: Patrick Daniel Nall, Louisville, KY (US)

(*) Notice: Subject to any disclaimer, the term of this patent is extended or adjusted under 35 U.S.C. 154(b) by 0 days.

(21) Appl. No.: 16/968,083

(22) PCT Filed: Jan. 17, 2020

(86) PCT No.: PCT/US2020/014078
§ 371 (c)(1),
(2) Date: Aug. 6, 2020

(87) PCT Pub. No.: WO2020/150599
PCT Pub. Date: Jul. 23, 2020

(65) Prior Publication Data
US 2021/0253340 A1   Aug. 19, 2021

Related U.S. Application Data

(60) Provisional application No. 62/902,796, filed on Sep. 19, 2019, provisional application No. 62/861,817, (Continued)

(51) Int. Cl.
*B65D 88/74* (2006.01)
*B65D 88/12* (2006.01)
(Continued)

(52) U.S. Cl.
CPC ......... *B65D 88/742* (2013.01); *B65D 88/121* (2013.01); *B65D 90/20* (2013.01); *C12H 1/22* (2013.01)

(58) Field of Classification Search
CPC .......... B65D 88/74–748; B65D 88/121; B65D 90/20; C12H 1/22
(Continued)

(56) References Cited

U.S. PATENT DOCUMENTS

| | | |
|---|---|---|
| 840,696 A | 1/1907 | Heberling |
| 1,084,022 A | 1/1914 | Martin |

(Continued)

FOREIGN PATENT DOCUMENTS

| | | |
|---|---|---|
| AU | 3994793 | 12/1993 |
| GB | 1549854 | 8/1979 |

(Continued)

OTHER PUBLICATIONS

Design Pine, 2012, www.design pine.com (Year: 2012).*

(Continued)

*Primary Examiner* — Anthony D Stashick
*Assistant Examiner* — James M Van Buskirk
(74) *Attorney, Agent, or Firm* — Stites & Harbison, PLLC; Terry L. Wright; Trevor T. Graves

(57) ABSTRACT

An assembly for maturing distilled spirits comprises a shipping container and a racking system positioned within the shipping container. The racking system includes a racking column attached to a pair of racking rails for supporting one or more barrels inside the shipping container. An external surface of the side walls of the shipping container has a light reflective value of less than about 10 while an external surface of the roof of the shipping container has a light reflective value of about 75 or more to induce a convective air flow around the racking system. Systems for maturing distilled spirits include a plurality of the assemblies for maturing distilled spirits in a stacked configuration. Methods for maturing distilled spirits comprise placing a plurality of barrels including distilled spirits on the racking system of an (Continued)

assembly for a period of time and under conditions sufficient to age the distilled spirits.

19 Claims, 10 Drawing Sheets

Related U.S. Application Data filed on Jun. 14, 2019, provisional application No. 62/794,374, filed on Jan. 18, 2019.

(51) Int. Cl.
*B65D 90/20* (2006.01)
*C12H 1/22* (2006.01)

(58) Field of Classification Search
USPC ....... 220/1.5; 211/22, 31, 33, 85.8; 428/142; 106/31.4; 252/582
See application file for complete search history.

(56) References Cited

U.S. PATENT DOCUMENTS

| | | | |
|---|---|---|---|
| 1,088,980 A | | 3/1914 | Goble |
| 1,151,210 A | | 8/1915 | Martin |
| 1,220,450 A | | 3/1917 | Pavey et al. |
| 2,146,533 A | | 2/1939 | Erickson |
| 2,471,693 A | * | 5/1949 | Lilienfeld ............... B65D 19/16 108/55.1 |
| 2,777,253 A | | 1/1957 | Bensin |
| 2,818,185 A | | 12/1957 | Mickey et al. |
| 3,141,537 A | * | 7/1964 | Dillaha ................... B60P 3/055 193/27 |
| 3,476,260 A | | 11/1969 | Jay |
| 4,091,939 A | | 5/1978 | Shimizu et al. |
| 4,249,520 A | | 2/1981 | Crillion |
| 4,260,072 A | | 4/1981 | Quasarano |
| 4,955,494 A | * | 9/1990 | Angelone ............ B65D 88/741 137/587 |
| 5,447,407 A | | 9/1995 | Weaver et al. |
| 6,050,538 A | | 4/2000 | Marrow et al. |
| 7,690,515 B2 | | 4/2010 | Thibodeau |
| 9,278,838 B2 | | 3/2016 | Apps et al. |
| 9,546,021 B2 | | 1/2017 | Stover et al. |
| 9,980,475 B2 | * | 5/2018 | Kaczanowski ........... A61L 2/07 |
| 11,006,586 B2 | * | 5/2021 | Plinke ................... H02S 20/23 |
| 2004/0226309 A1 | | 11/2004 | Broussard |
| 2012/0318763 A1 | | 12/2012 | Garton et al. |
| 2015/0307425 A1 | | 10/2015 | Cox |
| 2015/0337527 A1 | * | 11/2015 | Wallance ................ F24D 3/145 52/79.9 |
| 2018/0142192 A1 | * | 5/2018 | Ingram, III ............. C12G 3/07 |

FOREIGN PATENT DOCUMENTS

| | | |
|---|---|---|
| TW | M396814 | 1/2011 |
| WO | 2016/077796 A1 | 5/2016 |
| WO | 2018/089005 A1 | 5/2018 |
| WO | 2018/098368 A1 | 5/2018 |
| WO | 2018/132350 A1 | 7/2018 |

OTHER PUBLICATIONS

Concord Consortium, p. 1 (Year: 2013).*
"Temporary Storage (part 1)," Chadwick's Craft Spirits,chadwickscraftspirits.com, Jul. 24, 2016. http://www.chadwickscr aftspirits.com/blog/2016/7/24/temporary-storage-part-1 Disclosing rack for barrels within shipping containers (the photographs on the 2nd-3rd Pages).
"Fraser Coast Containers," Gumtree, gumtree.com, accessed: May 2019. https://www.gumtree.com.au/s-ad/owanyilla/miscellaneous-goods/shipping- container-drum-barrel/1206390056 Disclosing bespoke shipping containers for drums and barrels (Description).
"Tunquen," Advintage Distributing of the Carolinas + Tennesse, advintagedistributing.com, accessed: May 2019. https://www.advintagedistributing.com/tunquen Disclosing shipping containers with accommodations for barrels (see photograph on 1st Page).
U.S. Patent and Trademark Office, International Search Report and Written Opinion issued in corresponding Application No. PCT/US2020/014078, dated Mar. 23, 2020.

* cited by examiner

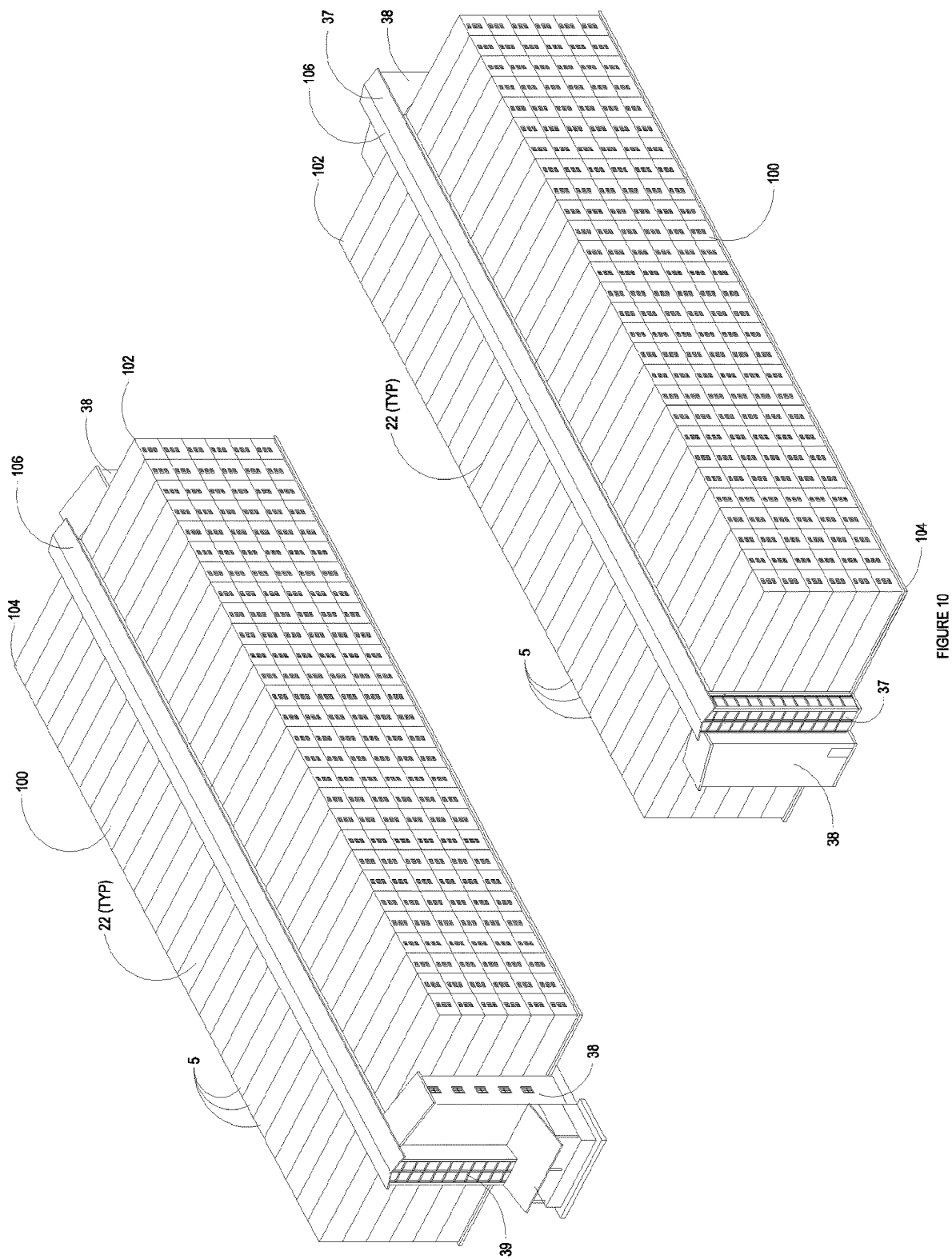

ASSEMBLIES, SYSTEMS AND METHODS FOR MATURATION OF DISTILLED SPIRITS

RELATED APPLICATIONS

This application claims priority from U.S. Provisional Application Ser. No. 62/794,374, filed Jan. 18, 2019, U.S. Provisional Application Ser. No. 62/861,817, filed Jun. 14, 2019, and U.S. Provisional Application Ser. No. 62/902,796, filed Sep. 19, 2019, the entire disclosures of each of which are incorporated herein by this reference.

TECHNICAL FIELD

The present invention relates to assemblies, systems, and methods for the maturation of distilled spirits. In particular, certain embodiments of the present invention relate to assemblies, systems, and methods for the maturation of distilled spirits that make use of a shipping container including a racking system positioned within the shipping container for supporting one or more barrels of distilled spirits.

BACKGROUND

The current state of the distilled spirits industry's aging process is a varied mix of warehouses. Most, if not all, distilleries age their spirits in flat, wooden racks that are housed in buildings constructed from heavy timbers and either masonry or light gauge steel exterior cladding. These predominantly wooden storage buildings are referred to as rack-supported structures. The second type of aging facility in the industry is a standard warehouse. This method of aging is referred to as a palletized storage and aging facility or a palletized warehouse. The palletized warehouse is typically comprised of light gauge steel cladding with barrels stacked on wood pallets inside the warehouse.

The maturation process for a particular distilled spirit varies from distillery to distillery, and each distillery has their own reasons why their aging warehouse is constructed in a particular manner. The common reasoning given for each warehouses' particular configuration is to achieve a similar flavor profile for that particular brand of distilled spirits. Some distilleries build identical warehouses and adopt processes for ensuring that their products remain consistent. Other distilleries rotate their barrels during the aging process to ensure a more even flavor profile within the barrels. Certain further distilleries use heat-cycling to enhance the aging process of their products, whereby the warehouse is heated during the wintertime and then left to cool back down, and then repeated. These two additional methods for enhancing the flavor of the spirits during the aging process are the most common in the industry.

Some jurisdictions do not require facilities for aging distilled spirits to comply with seismic or wind-load design criteria. Due to this fact, there have been several collapses of distilled spirits storage facilities in recent years, with the collapses resulting in not only the loss of the products, but also significant environmental contamination.

Accordingly, an improved assembly, system, and/or method for aging distilled spirits that combines industry best practices for maturation of distilled spirits and that makes use of a more cost-efficient and structurally sound assembly would be both highly desirable and beneficial.

SUMMARY

The present invention includes assemblies, systems, and methods for the maturation of distilled spirits. In particular, certain embodiments of the present invention relate to assemblies, systems, and methods for the maturation of distilled spirits that make use of a shipping container including a racking system positioned within the shipping container for supporting one or more barrels of distilled spirits.

In one embodiment of the present invention, an assembly for maturing distilled spirits is provided that comprises a shipping container and a racking system. The shipping container includes two side walls, a floor, a roof, a closed end, and an open end defining an internal cavity. The shipping container can further include a door attached to each side wall of the shipping container at the open end such that the doors can be used to sealably close the open end of shipping container. The racking system is then positioned within the internal cavity of the shipping container and incudes a racking column attached to a pair of racking rails for supporting one or more barrels inside the shipping container.

To allow the shipping container to be efficiently used for the maturation of distilled spirits and to create a convective air flow within the shipping container, the external surface of the each of the two side walls of the shipping container has a light reflective value of less than about 10 and an external surface of the roof has a light reflective value of about 75 or more to induce a convective air flow around the racking system. In some embodiments, the external surface of the closed end of the shipping container also has a light reflective value of less than about 10. For example, in some embodiments, each of the two side walls has a light reflective value of about 5, while the external surface of the roof has a light reflective value of about 88. To further control the flow of air within the shipping container, in some embodiments, the shipping container includes one or more louvers for adjusting the air flow into the shipping containers, such as, in some embodiments, one or more louvers positioned in the closed end of the shipping container.

Further provided, in some embodiments of the present invention, is a system that includes a plurality of the maturation assemblies described above. In some embodiments of such a system, the plurality of maturation assemblies comprises a first plurality of maturation assemblies arranged in a stacked configuration and a second plurality of maturation assemblies arranged in a stacked configuration. The two pluralities of stacked maturation assemblies are then further arranged such that the open end of each shipping container in the first plurality of maturation assemblies faces a corresponding open end of a shipping container in the second plurality of maturation assemblies. In some embodiments, the stacked configuration of the maturation assemblies can further be arranged in two or more tiers of maturation assemblies, with a walkway positioned between each of the corresponding tiers of the first plurality of maturation assemblies and the second plurality of maturation assemblies. A roof can also be included in such an exemplary system and positioned over the walkways, along with a barrel lift that can be positioned at an end of the walkways.

Still further provided, in some implementations of the present invention, are methods for aging distilled spirits. In some implementations, an assembly for maturing distilled spirits is provided, and a plurality of barrels including distilled spirits is subsequently placed on the racking rails of the assembly for a period of time and under conditions sufficient to mature the distilled spirits.

Further features and advantages of the present invention will become evident to those of ordinary skill in the art after a study of the description, figures, and non-limiting examples in this document.

BRIEF DESCRIPTION OF THE DRAWINGS

FIG. 10 is a schematic diagram showing an exemplary system for maturing distilled spirits made in accordance with the present invention.

DESCRIPTION OF EXEMPLARY EMBODIMENTS

Figure 1:
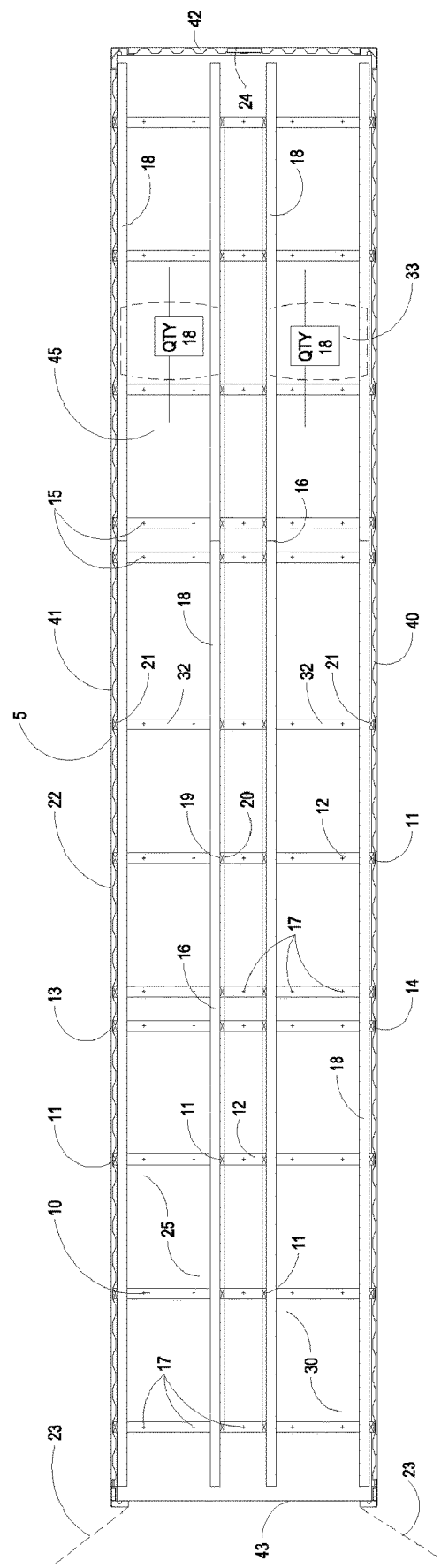
FIG. 1 is a top view of an assembly for maturing distilled spirits made in accordance with the present invention, and with the roof of an exemplary shipping container removed to show the racking system positioned within the shipping container.
Figure 2:
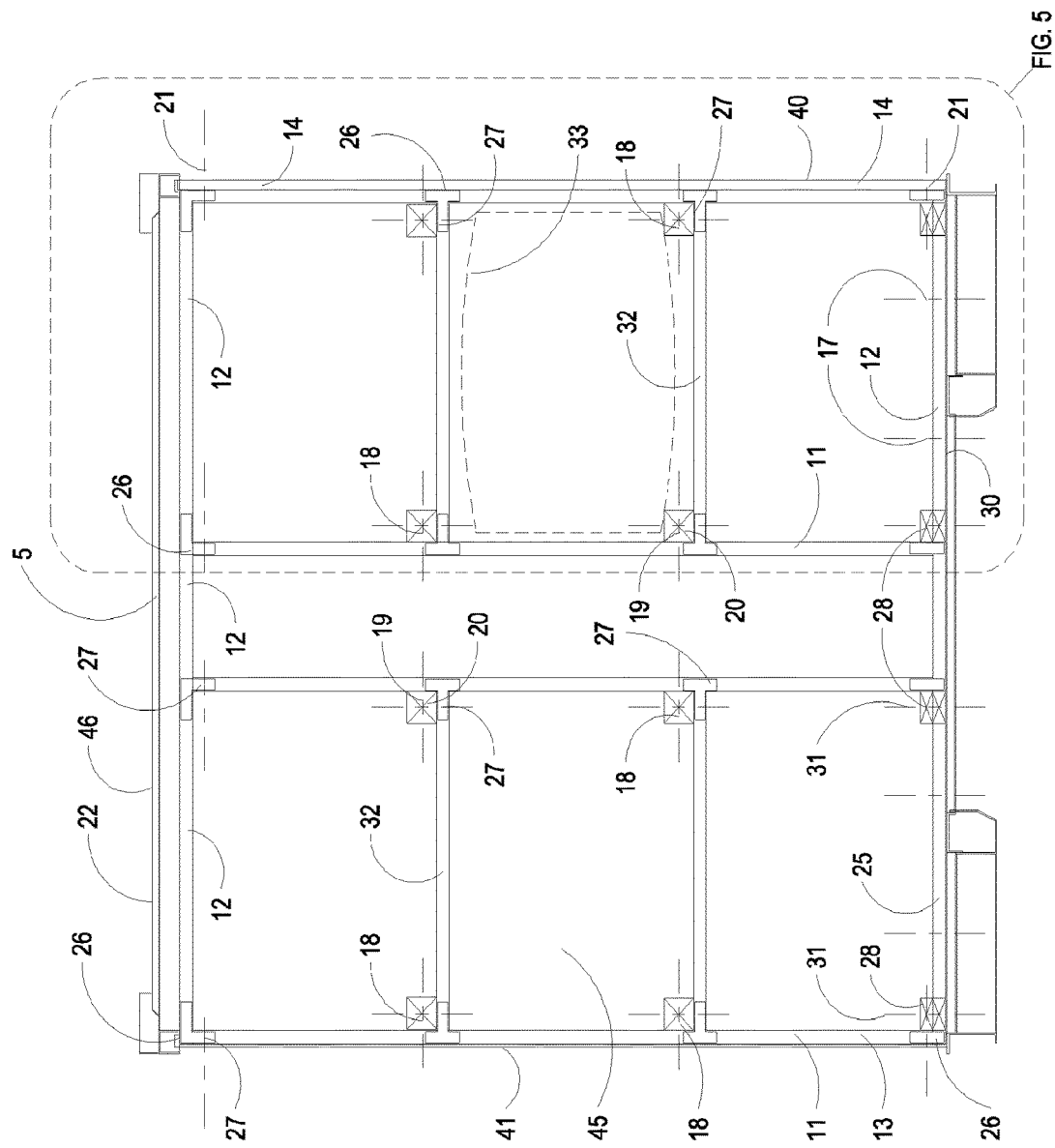
FIG. 2 is an end view of the assembly of FIG. 1, and showing the aisle way included in the shipping container with a racking system positioned on either side of the shipping container.
Figure 3:
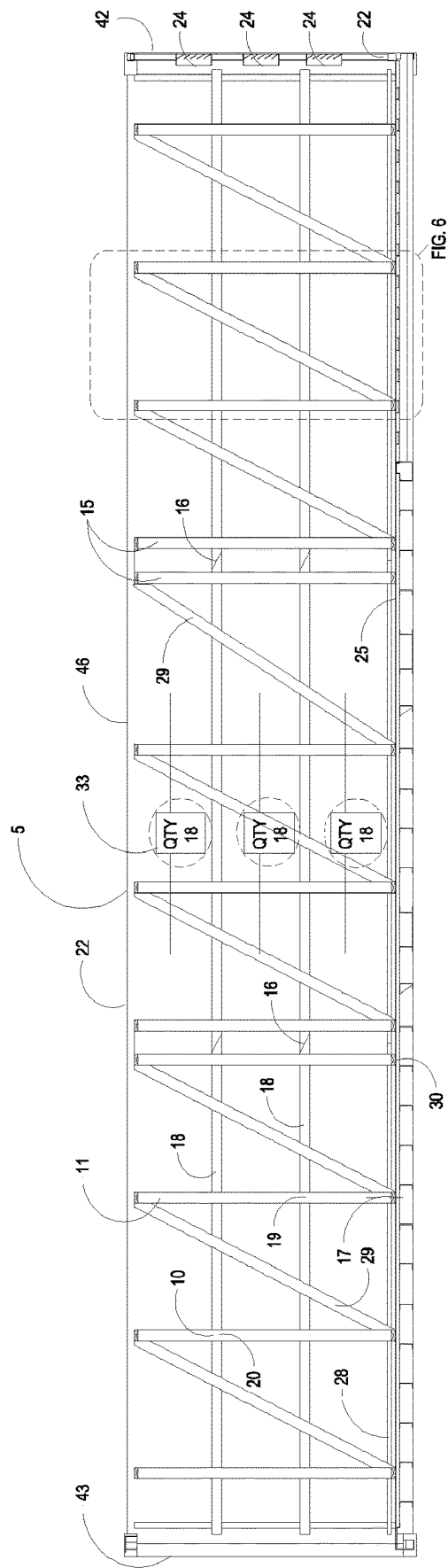
FIG. 3 is a cut-away side view of the assembly of FIG. 1, and showing the racking system as seen from the aisle way between the racking systems within the shipping container.
Figure 4:
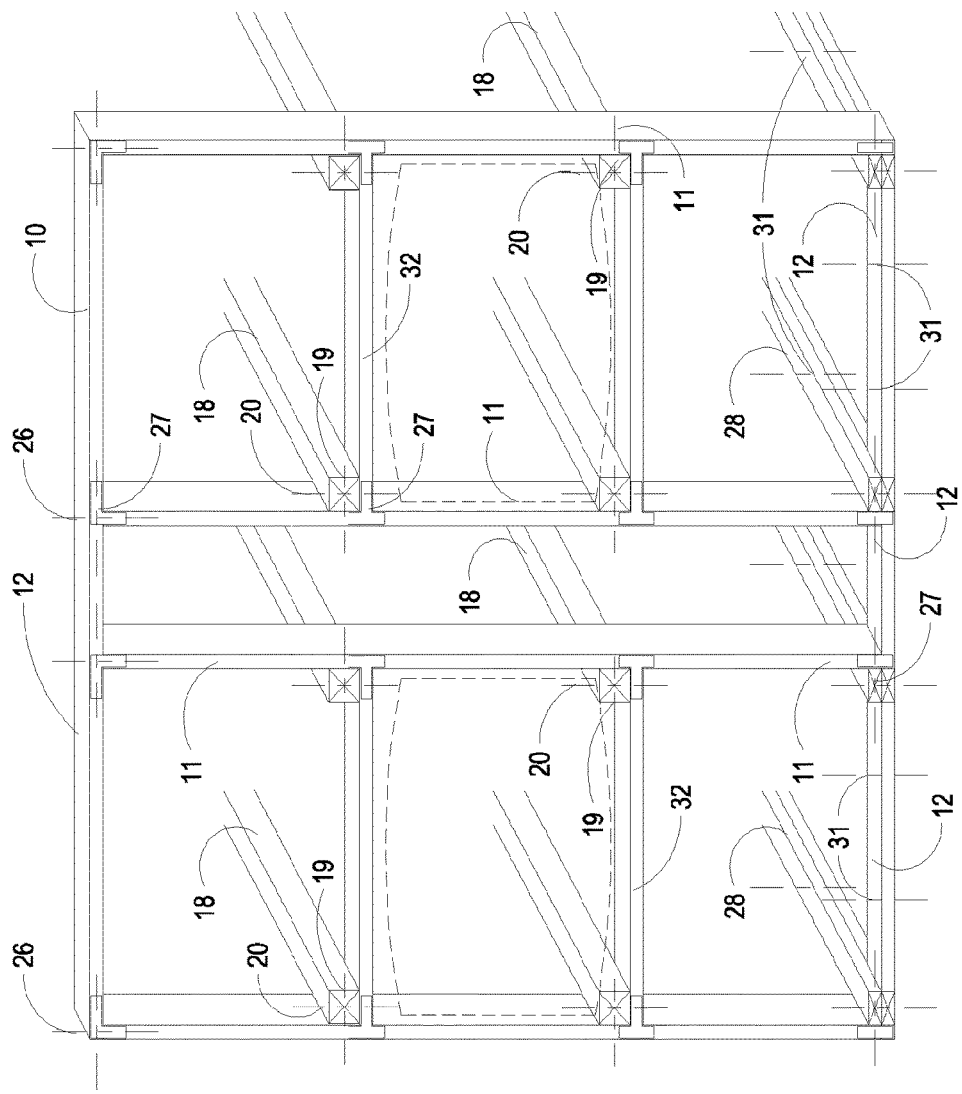
FIG. 4 is a partial view of the exemplary racking system shown in FIG. 1, and showing a detailed view of the configuration of the structural frame of the racking system used to support the racking rails and barrels.
Figure 5:
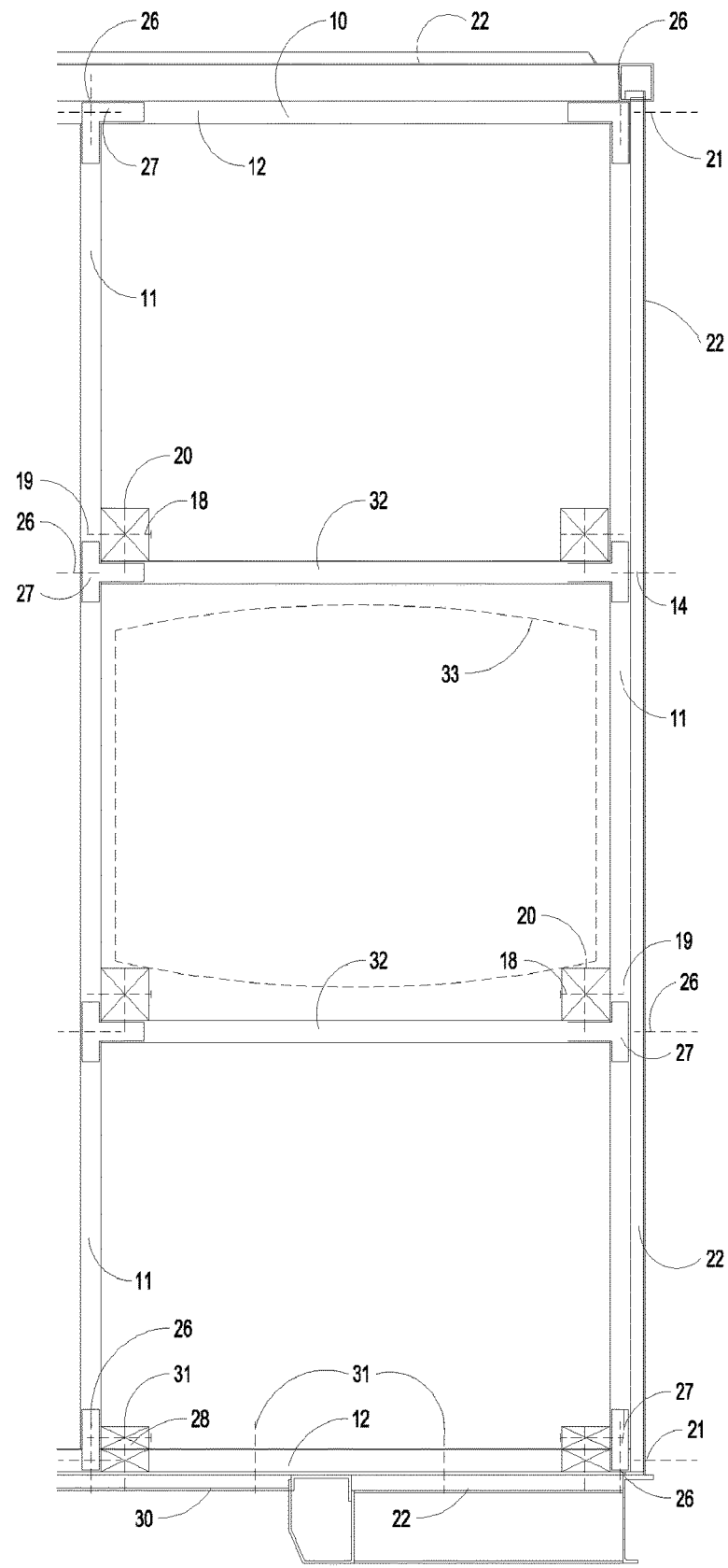
FIG. 5 is another partial view of the exemplary racking system shown in FIG. 1, and showing the connection of the racking system to the shipping container.
Figure 6:
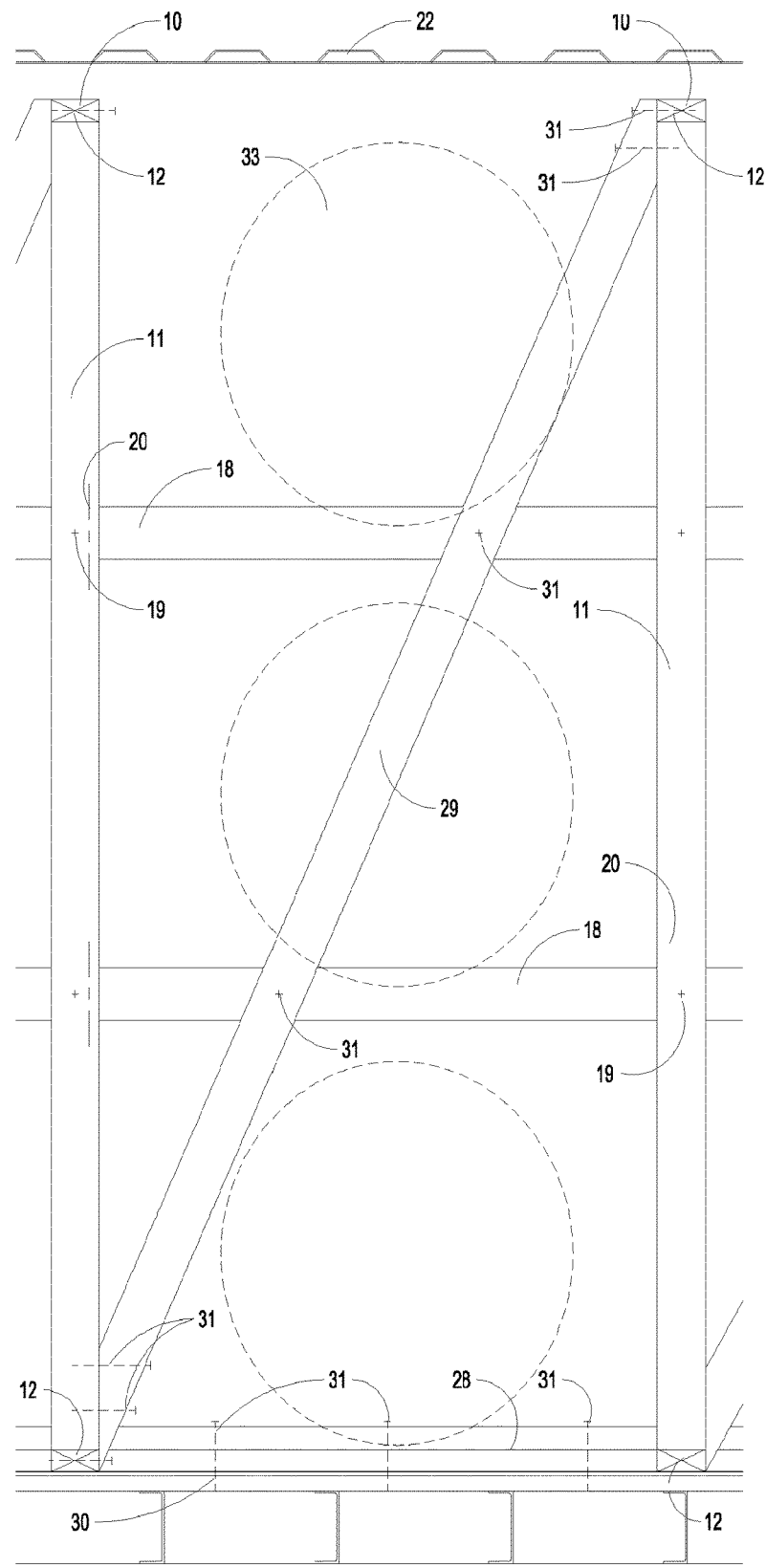
FIG. 6 is another partial view of the exemplary racking system shown in FIG. 1, and showing the cross bracing between the racking columns.

The present invention includes assemblies, systems, and methods for the maturation of distilled spirits. In particular, certain embodiments of the present invention include assemblies, systems, and methods for the maturation of distilled spirits that make use of a shipping container including a racking system positioned within the shipping container for supporting one or more barrels of distilled spirits.

Referring first to FIGS. 1 and 7-9, an exemplary assembly 5 for maturing distilled spirits made in accordance with the present invention comprises a shipping container 22 and a racking system 10. The shipping container 22 of the assembly includes two side walls 40, 41, a floor 30, a roof 46, a closed end 42, and an open end 43 that collectively define an internal cavity 45 of the shipping container 22. The shipping container 22 further includes doors 23 attached to each side of the shipping container 22 at the open end 43 to close and seal the open end 43 of the shipping container 22. The doors 23 of the shipping container 22 can further be removed or, in certain embodiments, can be absent from the shipping container 22 to allow the assembly 5 to be included in a system for maturing distilled spirits that makes use of a plurality of the assemblies 5, as described in further detail below. Regardless of the whether the doors are included or removed from the shipping container, however, the two side walls 40, 41 the floor 30, the roof 46, the closed end 42, the open end 43, and the doors 23 included in the shipping container 22 are generally each of a heavy gauge steel construction sufficient to support the racking system 10 as well as the barrels 33 of distilled spirits that may be loaded onto the racking system 10. For instance, in certain embodiments, the shipping container can be a standard intermodal shipping container constructed in accordance with ISO 1496-1.

With respect to the racking system 10 included in the exemplary assembly 5, and referring now to FIGS. 1-6, the assembly 5 includes a racking system 10 positioned against each of the side walls 40, 41 of the shipping container 22 and within the internal cavity 45 of the shipping container 22. Each racking system 10 includes three tiers of racks, with the racking systems 10 positioned on either side of the shipping container 22 with a passageway or aisle way formed between each racking system 10. In this regard, and as described in further detail below, each tier of racks is generally comprised of a plurality of vertical racking columns 11 that support and/or are connected to a pair of racking rails 18, 28 included in a respective one of the tiers and which run parallel to one another along the length of the shipping container 22. The racking rails 18, 28 are spaced at a sufficient distance from one another to provide a surface on which barrels 33 may be stored horizontally (i.e., on their sides) to maximize the oxygenation of the distilled spirits included within the barrels 33. In this regard, through the use of the shipping container 22, the assembly 5 is thus constructed to accommodate standard 53-gallon oak barrels in each racking system 10. However, it is of course contemplated that alternatively sized racking systems can be included in an exemplary system to accommodate barrels of varying sizes without departing from the spirit and scope of the present invention.

In each racking system 10, each of the racking columns 11 and racking rails 18, 28 may be generally assembled with use of a pre-engineered frames that are tied together with bracing (and with the rails 18, 28 themselves) to distribute the weight of the barrels evenly throughout the floor 30 of the shipping container 22 and to allow a system of assemblies 5 to be efficiently constructed. In particular, in the exemplary racking system 10 shown in FIGS. 1-6, each racking system 10 is comprised of twelve pre-fabricated frame sections in order to provide a load-bearing rack sufficient to support the weight of up to one hundred eight (108) of the barrels 33 and to transfer that load to the floor 30 of the shipping container 22. Each of the twelve pre-fabricated frame sections is comprised of four racking columns 11 at each frame section and two continuous top and bottom horizontal members 12 positioned at the top and bottom of a particular frame section and extending between the side walls 40, 41 of the shipping container 22. Four horizontal bridging members 32 are then included in the end of each frame section to support the racking rails 18.

To further support the racking system 10 and any associated barrels 33 of distilled spirits, each racking system 10 is generally positioned in the shipping container 22 partially inside the flutes 13 of the side walls 40, 41 of the shipping container 22 and is then further secured to the side walls 40, 41 through the use of shims 14 positioned between the racking system 10 and the side walls 40, 41. Moreover, given the length of the shipping container 22, the racking columns 11 are generally positioned closer to one another to create double frame sections 15 at areas where the racking rails 18, 28 are spliced together and form splice connection points 16. To further support the barrels 33, the racking system 10 further includes a number of cross-braces 29 extending at an angle from the top to the bottom of the racking system 10 between the racking columns 11.

To fasten the components of the racking system 10 together and provide a sufficient supporting structure, the exemplary racking system shown in FIGS. 1-6 is generally attached to the floor 30 of the shipping container 22 with structural screws 17, 31, while the racking rails 18 are installed on the horizontal structural members 12 or horizontal bridging members 32 of each racking system 10 and secured with structural screws 17, 31. The racking rails 28 on the bottom tier of each racking system 10 are also attached to the remainder of the racking system 10 and to the shipping container 22 with structural screws 17, 31 to lock the frame sections in place at the bottom of the racking system 10. The racking system 10 is additionally attached to the shipping container 22 at the top and bottom of the shipping container 22 at connection points 21, and is held together using nails 26 and gang plates 27 at various connections along with a number of horizontal 19 and vertical 20 screws. In this regard, to allow the use of structural screws and nails to connect the portions of the racking system 10 together while providing a racking system that prevents sparking and minimizes the possibility of subsequent fires within a distilled spirit aging environment, the racking system 10 is generally comprised of wood. It is appreciated, however, that a number of different building materials and fasteners can also be utilized to construct an exemplary racking system without departing from the spirit and scope of the present invention.

Figure 7:
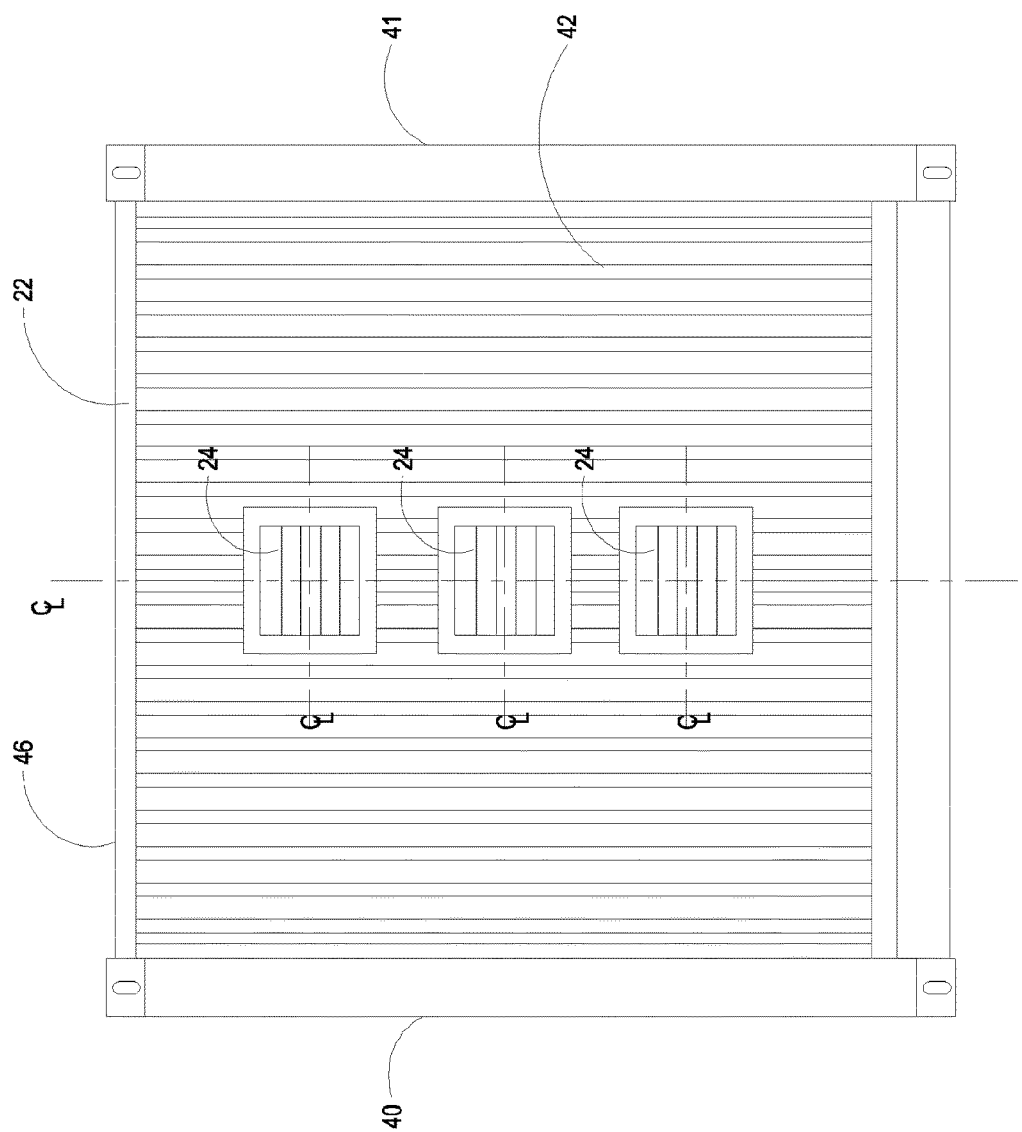
FIG. 7 is a rear view of the shipping container shown in FIG. 1, and showing the configuration of the louvers on the closed end of the shipping container.
Figure 8:
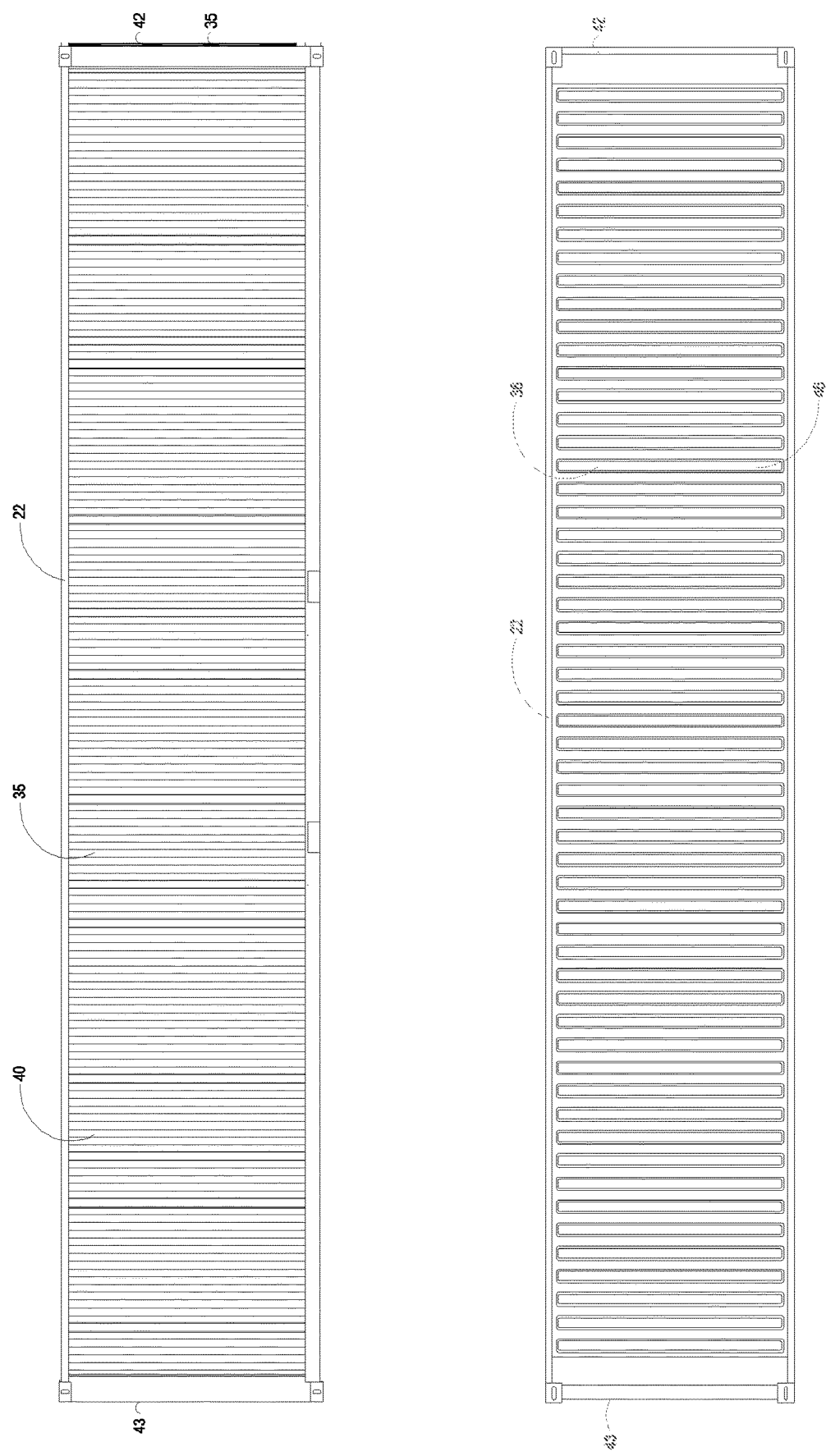
FIG. 8 includes a side view (top image) and top view (bottom image) of the shipping container shown in FIG. 1, and showing an exemplary paint scheme to induce convective airflow within the shipping container.
Figure 9:
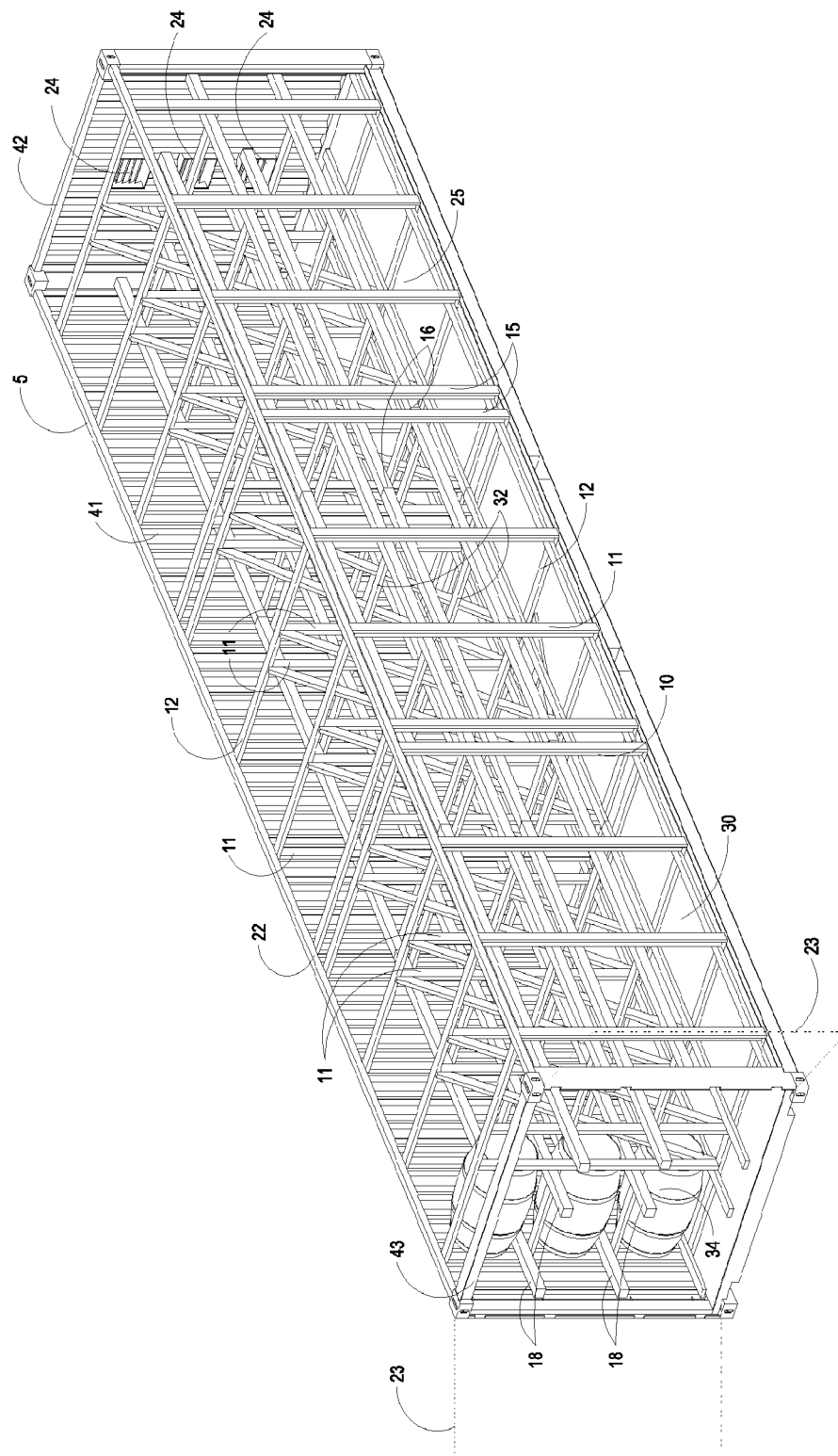
FIG. 9 is a cut-away view of the apparatus of FIG. 1, with the roof, a side wall, and the doors of the shipping container removed to show the racking system within the shipping container.

Turning now to FIGS. 7-9, the shipping container 22 included in the exemplary assembly 5 for maturing distilled spirits is generally comprised of a heavy gauge steel and is typically a standard container having dimensions of 40'-0" in length, 8'-6" in height, and 8'-0" in width. To allow sufficient air circulation within the shipping container 22, and, in cases where the doors 23 are removed from the shipping container 22, cross-ventilation along the length of the shipping container 22, the shipping container 22 includes three ventilation louvers 24 that are positioned adjacent to each tier of the racking system 10, and are centered horizontally on the closed end 42 of the shipping container 22 and centered vertically in the barrel space within each tier of the racking system 10, as perhaps shown best in FIG. 7. Of course, it is further appreciated that more or less ventilation louvers may also be included in an exemplary shipping container and that such louvers may be configured to be opened or closed as desired to control an amount of air flow in and through an exemplary shipping container.

To allow the shipping container 22 to be effectively used to mature distilled spirits, the floor 30 of the shipping container includes a coating 25 having a high light reflective value (e.g., greater than 75) to provide a visual indication of any leaks in the barrels 33, while at the same time providing a barrier from any contaminants that may present within the floor 30 of the shipping container 22.

Turning now to FIG. 8, to further allow the shipping container 22 to be used for the maturation of distilled spirits, various portions of the shipping container are provided with differing light reflective values to improve ventilation within the shipping container 22 and, in particular, to create a convective airflow that allows air to flow around the barrels 33 included on the racking systems 10 in order to support and enhance the maturation process of the distilled spirits. In this regard, in the exemplary shipping container 22, the external surface of each of the two side walls 40, 41 as well as the closed end 42 of the shipping container 22 is coated with a material 35, e.g., a paint, having a light reflective value of less than about ten (10), while the external surface of the roof 46 of the shipping container 22 is generally coated with a material 36 having a light reflective value of about 75 or more to induce convective air flow around and throughout the racking system 10. For example, in the shipping container 22, the external surface of each of the two side walls 40, 41 and the closed end 42 of the shipping container 22 are coated with a brown or gray paint having a light reflective value of 5 (LRV-5), and the external surface of the roof 46 of the shipping container 22 is coated with a white paint having a light reflective value of 88 (LRV-88). By coating the external surfaces of the shipping container 22 in such a manner, the higher LRV material 36 coating the roof 46 of the shipping container 22 thus creates a relatively lower ambient temperature toward the upper parts of the shipping container 22 in the internal cavity 45 by reflecting solar radiation from the roof 46 of the shipping container 22. The lower LRV materials 35 coating the side walls 40, 41 and closed end 42 of the shipping container 22 creates a relatively high ambient temperature by absorbing solar radiation, which, in turn, then creates convective air movements out of the shipping container 22 by virtue of the convective air current created by colder, denser air moving towards warmer, less dense air. In short, the cooler roof 46 of the shipping container 22 essentially acts to push air out of the shipping container 22 through the open end 43 and the louvers 24 through the creation of convective air flow.

Turning now to FIGS. 9-10, the assemblies 5 for maturing distilled spirits described herein are further configured for use as part of a larger system 100 for maturing distilled spirits that is capable of mimicking the aging process typically observed through the use of a standard rack-supported wood barrel warehouse. In such a system 100, the system 100 includes a first plurality 102 of maturation assemblies 5 in a stacked configuration and a second plurality 104 of maturation assemblies 5 in a stacked configuration that are spaced apart from and facing one another. In particular, in the system 100, the open end 43 (i.e., with the doors 23 removed) of each shipping container 22 included in the first plurality 102 of maturation assemblies faces a corresponding open end 23 of a shipping container 22 in the second plurality 104 of maturation assemblies. In this way, and as shown in FIG. 10, the stacked configuration of maturation assemblies 102, 104 can be assembled in two or more tiers of maturation assemblies with the respective tiers of each plurality of maturation assemblies facing one another. A walkway 37 is then positioned between each of the corresponding tiers of the first plurality 102 of maturation assemblies and the second plurality 104 of maturation assemblies to allow access to the open ends 43 of the maturation assemblies. A roof 106 can also be positioned over the walkway 37 to create a close environment and protect the walkways 37 from the elements. Moreover, to allow access to and provide the ability to transport barrels of distilled spirits to a particular maturation assembly 5 within the system 100, the system 100 further includes egress stairways 38 along with a barrel lift 39 positioned at an end of the walkways 37.

Finally, in some implementations of the present invention, by making use of the assemblies and systems described herein, a method for aging spirits is provided that includes the steps of: providing an assembly or system for maturing distilled spirits according to the present invention; and placing a plurality of barrels including distilled spirits on the racking rails for a period of time and under conditions sufficient to age the distilled spirits.

In some embodiments, by making use of the assemblies, systems, and methods of the present invention, a distilled spirit aging facility can thus be provided that is low cost, with each system costing approximately 15-20% less than that of a similar capacity building built in the traditional wood-framed rickhouse design, and that is also safer and more sustainable. Moreover, by making use of the assemblies, systems, and methods of the present invention, a facility and storage system can be provided that has the advantage of: a heavy gauge steel construction; being readily available; being scalable—can be built as needed; being easily made earthquake resistant; having doors that open to make for easy monthly inspection; having different variations on stacking/rotating containers for aging experiments; being capable of being sealed tightly to minimize angel's share; being integrated into the brand's sustainability story; needing only minimal electricity for lighting and monitoring; having an short construction term and can be built as-needed once foundations are in-place; and, in the event of a fire, isolating the fire to the number of barrels in the single container (e.g., 108 barrels).

Furthermore, by making use of such shipping container-based systems and methods, the systems and methods of the present invention incorporate or are capable of following a number of best practices in distilled spirit (e.g., bourbon) aging, including: orienting the building north-south in the long direction; allowing for temperature fluctuations, but also providing a way for heat to escape when the interior gets too hot and a way to close off the air flow in the winter; having a highly reflective roof and dark walls; having a racking system that makes it easy to inspect the barrels; and complying with seismic design criteria.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. An assembly for maturing distilled spirits, comprising:
   a shipping container having two side walls, a floor, a roof, a closed end, and an open end defining an internal cavity; and
   a racking system positioned within the internal cavity of the shipping container, the racking system including a racking column attached to a pair of racking rails for supporting one or more barrels inside the shipping container,
   wherein an external surface of each of the two side walls has a light reflective value of less than 10 and an external surface of the roof has a light reflective value of 75 or more to induce a convective air flow around the racking system.

2. The assembly of claim 1, wherein an external surface of the closed end has a light reflective value of less than 10.

3. The assembly of claim 1, wherein the external surface of each of the two side walls has a light reflective value of 5.

4. The assembly of claim 1, wherein the external surface of the roof has a light reflective value of 88.

5. The assembly of claim 1, wherein the shipping container includes one or more louvers for adjusting the air flow into the shipping container.

6. The assembly of claim 5, wherein the one or more louvers are positioned in the closed end of the shipping container.

7. The assembly of claim 5, wherein the one or more louvers comprises three louvers.

8. The assembly of claim 1, wherein the shipping container further includes a door attached to each side wall of the shipping container at the open end, each door for sealably closing the open end of shipping container.

9. The assembly of claim 1, wherein the floor of the shipping container has a light reflective value greater than 75.

10. The assembly of claim 1, wherein the racking system is secured to the floor and the roof of the shipping container.

11. The assembly of claim 1, wherein the racking column and the pair of racking rails are comprised of wood.

12. The assembly of claim 1, wherein each of the pair of racking rails are spaced at a distance from one another sufficient to support the one or more barrels upon positioning the one or more barrels in a horizontal configuration.

13. A method for aging distilled spirits, comprising:
   providing an assembly for maturing distilled spirits according to claim 1; and
   placing a plurality of barrels including distilled spirits on the racking rails for a period of time and under conditions sufficient to age the distilled spirits.

14. A system for maturing distilled spirits, comprising:
   a plurality of maturation assemblies, each maturation assembly including
   a shipping container having two side walls, a floor, a roof, a closed end, and an open end defining an internal cavity; and
   a racking system positioned within the internal cavity of the shipping container, the racking system including a racking column attached to a pair of racking rails for supporting one or more barrels inside the shipping container,
   wherein the plurality of maturation assemblies are in a stacked configuration, and
   wherein an external surface of each of the two side walls of each shipping container has a light reflective value of less than 10 and an external surface of the roof of each shipping container has a light reflective value of 75 or more to induce a convective air flow around the racking system.

15. The system of claim 14, wherein the plurality of maturation assemblies comprises a first plurality of maturation assemblies in a stacked configuration and a second plurality of maturation assemblies in a stacked configuration, and
   wherein the open end of each shipping container in the first plurality of maturation assemblies faces a corresponding open end of a shipping container in the second plurality of maturation assemblies.

16. The system of claim 15, wherein the stacked configuration of the first plurality of maturation assemblies comprises two or more tiers of maturation assemblies, and wherein the stacked configuration of the second plurality maturation assemblies comprises a number of tiers of maturation assemblies equal to that present in the stacked configuration of the first plurality of maturation assemblies.

17. The system of claim 16, further comprising a walkway positioned between each of the corresponding tiers of the first plurality of maturation assemblies and second plurality of maturation assemblies.

18. The system of claim 17, further comprising a roof positioned over the walkways.

19. The system of claim 18, further comprising a barrel lift positioned at an end of the walkways.

* * * * *